3,378,842
METHOD AND APPARATUS FOR EMITTER LOCATION DETECTION

Bernard E. Phillips, Bethesda, Md., assignor to The Bunker-Ramo Corporation, Stamford, Conn., a corporation of Delaware
Filed Feb. 20, 1967, Ser. No. 617,397
20 Claims. (Cl. 343—112)

ABSTRACT OF THE DISCLOSURE

A method for determining the range of a stationary emitter of some form of radiation from a moving platform by continuously sampling the bearing of the emitter, and using the cotangent of the bearing angle, or some other function of the bearing angle which is a linear function of time, in conjunction with the velocity of the platform to complete the desired range. Apparatus for implementing the above method is also presented.

---

Figure 1:
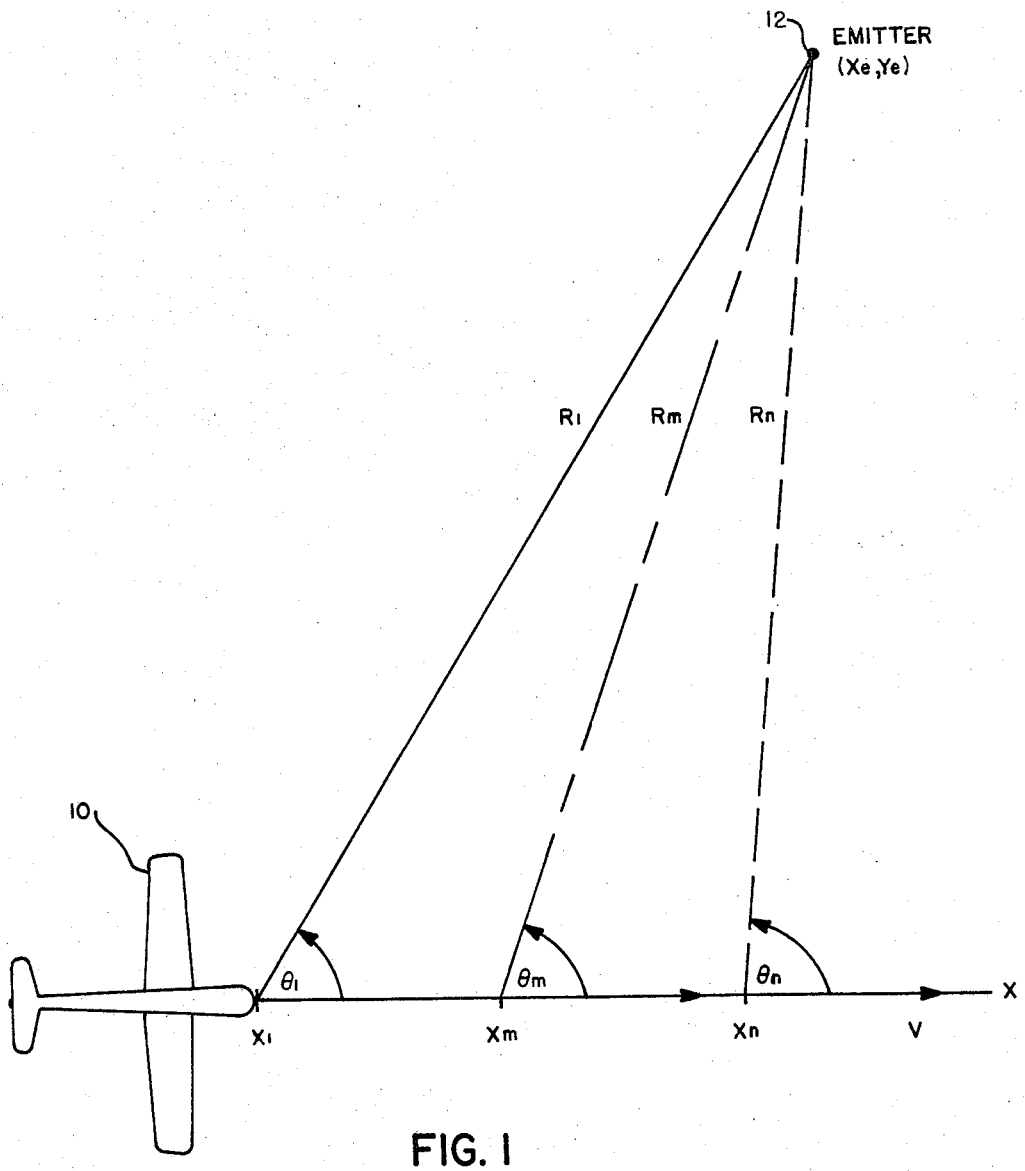

This invention relates to a method of detecting the location of a stationary emitter of some form of radiation and to apparatus for implementing this method. More particularly, the invention relates to method and apparatus for detecting the range and direction of a stationary radiation emitter from a moving platform.

There are many situations in which it is required to locate the source of an electro-magnetic radiation such as light, radio, infrared, etc., which source is at a fixed location, by means of observations from a moving platform such as an aircraft. Heretofore, such a determination has been made using devices based on the method of triangulation. With some variations, this method generally involves the following steps:

(1) Tune a radio receiver to the proper frequency.

(2) Make measurements of the angle of arrival of the radio signal with respect to North, as displayed by a radio compass, or with respect to the aircraft axis.

(3) Determine the aircraft's position relative to the earth by means of the aircraft navigation system and the navigator's calculations.

(4) Repeat the process at one or more additional aircraft locations.

(5) Solve the triangles formed by the lines of direction (cuts) and the aircraft's flight tracks, thus locating the source of the signal (the emitter location).

This commonly used procedure has a number of undesirable features. First, it requires appreciable time between cuts, typically ten or more minutes, in order to obtain angles between the cuts of at least 30 degrees, to allow reasonable accuracy of location. Therefore, in order to utilize the equipment intensively, the waiting times between cuts are occupied by making observations on other emitters, creating the necessity for a laborious and frequently uncertain signal sorting procedure. Proper analysis with a stystem of this type requires laborious statistical calculations, usually involving the use of a ground-based electronic digital computer. Another disadvantage of the existing procedure is that it is difficult to verify the accuracy of the initial cuts until a time long after that when the cuts are taken. These cuts are therefore almost impossible to correct. Also, because of the long period of time between cuts, the actual number of cuts taken is usually relatively small. This decreases the statistical base for the position determination with a corresponding decrease in the reliability of the final determination.

It is therefore, apparent that a need exists for an improved method of emitter location with a reasonable degree of accuracy in a matter of seconds rather than hours as with present systems. Such a rapid emitter location would eliminate the usual signal sorting requirements, or at least greatly reduce them, and would therefore simplify the entire operation. At worst, it may be necessary to sort among emitters detected over a period of seconds, rather than over a period of an hour or more. The increased speed of determination also allows the use of a real time display of emitter location as the readings are being taken. This display, by its fluctuations, provides an indication of the increasing reliability of the location as the number of cuts is increased. Since a large number of cuts may be taken in a relatively short period of time, the effect of random errors on the final determination is appreciably reduced, and the taking of new readings may be discontinued when a stable location has been determined. The mathematical procedures required to make the location determinations with the improved system should be simple enough so as to be realizable in a special purpose, airborne, analog or digital computer. Since, in many applications, it is preferable to determine emitter location with respect to the aircraft position rather than with respect to a ground coordinate system, the system should be capable of operating in this mode. However, it should be adaptable, with the addition of aircraft navigation data, to provide a position relative to a ground coordinate system.

It is therefore a primary object of this invention to provide an improved method and apparatus for detecting the location of a radiation emitter.

A more specific object of this invention is to provide an emitter location technique which is both rapid and reliable.

Another object of this invention is to provide an emitter location technique which is rapid enough so that extensive data sorting is not required and which is simple enough so that it may be realized with a special-purpose airborne computer.

Still another object of this invention is to provide an emitter-locating technique which permits a large number of cuts to be taken in a relatively short period of time, so that the location may be displayed on real time basis, and fluctuations resulting from erroneous readings detected.

A still further object of this invention is to provide an emitter-locating technique which permits the emitter to be located with respect to the position of a moving platform such as an aircraft, but which is adapted to provide locations in a ground base coordinate system as well.

Another object of this invention is to provide a real-time data processing technique capable of keeping up with improved direction-finding equipment which can output cuts at extremely high rates, and to avoid the necessity for voluminous records.

In accordance with these objects this invention provires for the determining of the instantaneous bearing angle of the radiation emitter relative to the direction of movement of a platform such as an airplane. The velocity of the platform is also determined. A function of the instantaneous bearing angle, which function has a constant time derivative, is then generated and this function is used in conjunction with the velocity measurement to compute the range of the emitter from the platform. In the preferred embodiment of the invention the function used is the cotangent. The least squares or similar linear approximation method may be used in fitting the various readings to make the required calculations.

The foregoing and other objects, features and advantages of the invention will be apparent from the following more particular description of a preferred embodiment of the invention, as illustrated in the accompanying drawings.

In the drawings:

FIG. 1 is a diagram illustrating the environment in which the technique of this invention would be employed.

Figure 2A:
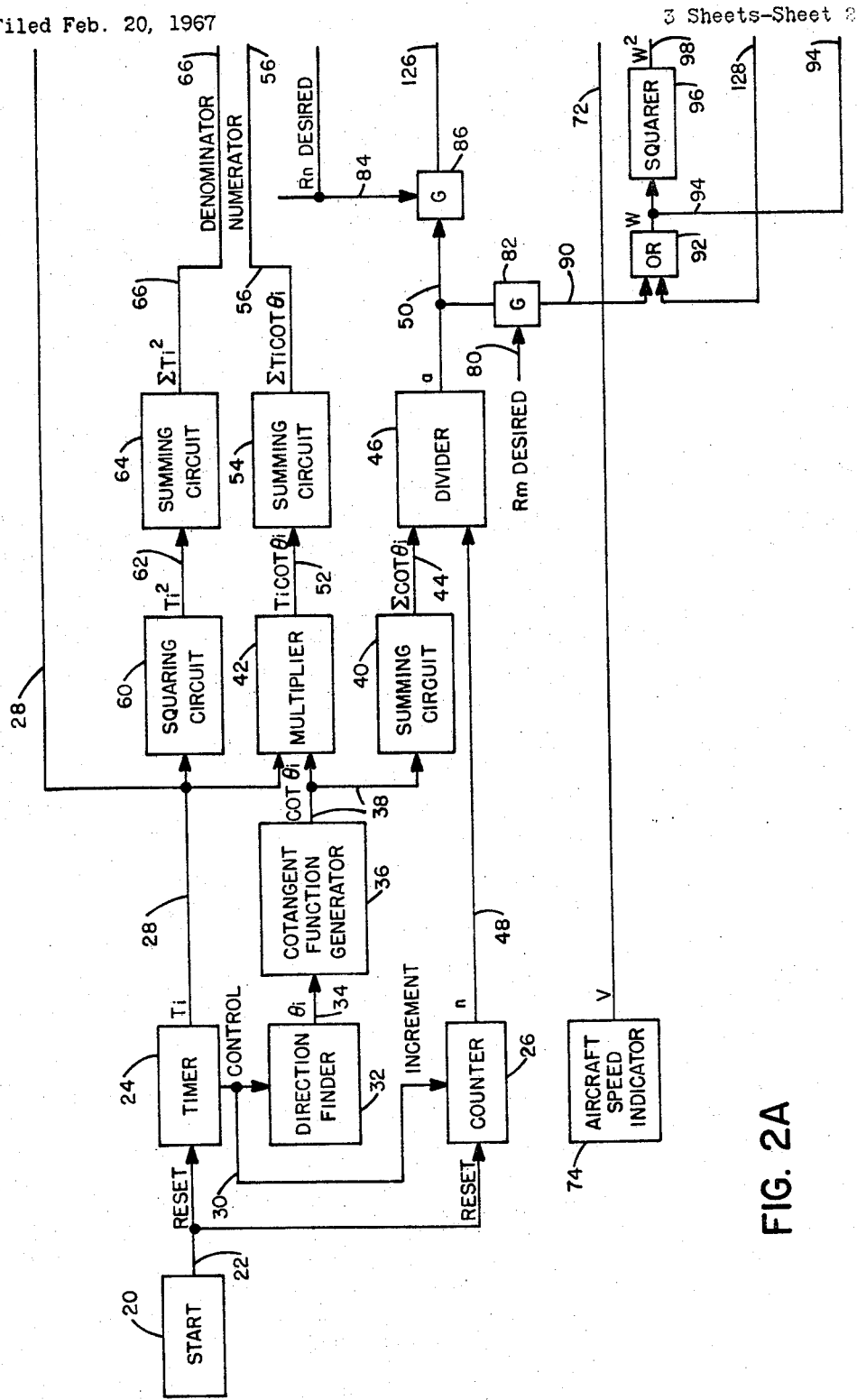
Figure 2B:
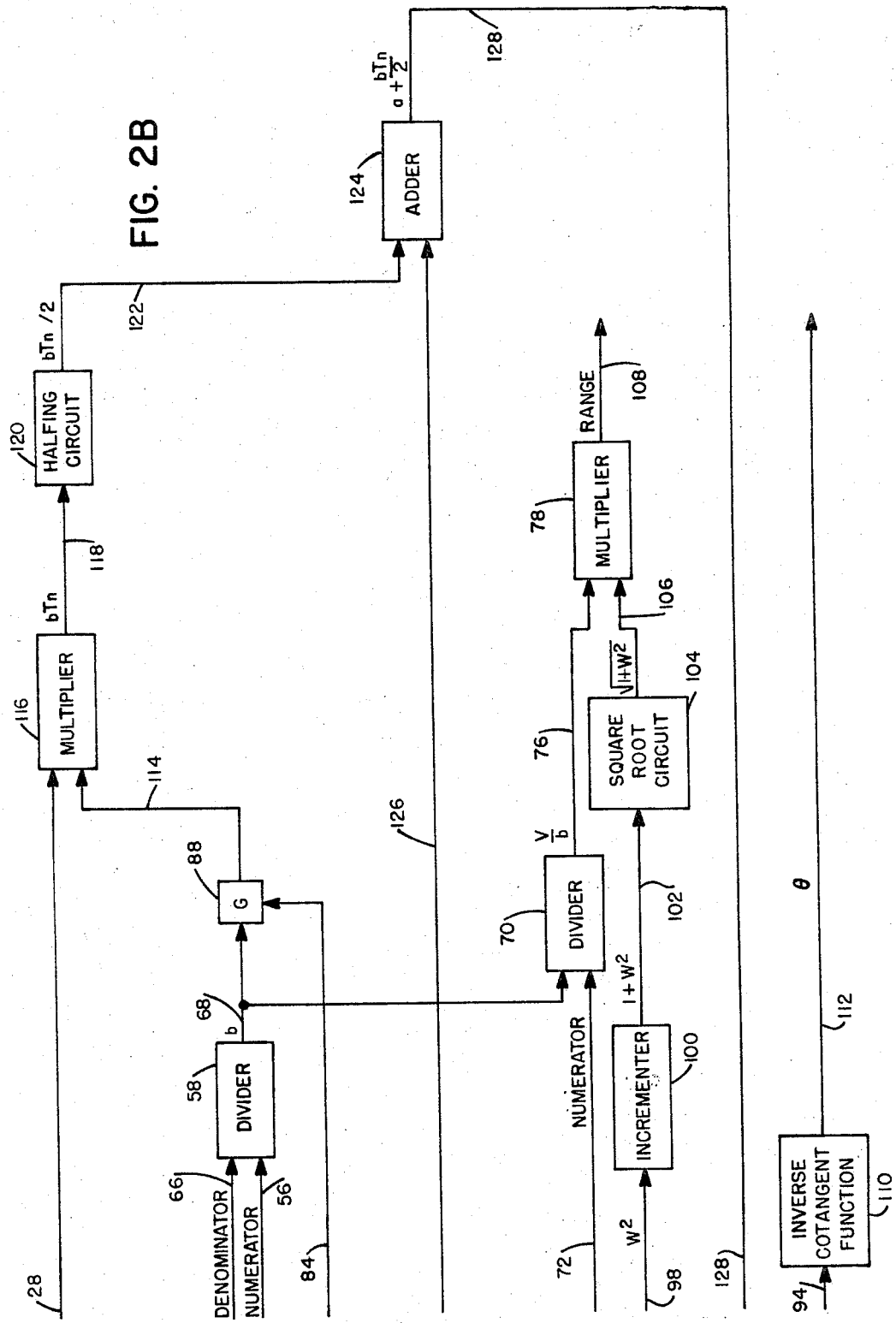

FIGS. 2A and 2B combine to form a block schematic diagram of an embodiment of the invention.

Referring now to FIG. 1, it is seen that the equipment for making the emitter location determination is mounted in an airplane, or similar moving platform, moving in a direction X with a velocity V. An emitter 12 of electromagnetic radiation, such as light or radio, is located at a distance R in a direction $\theta$ from platform 10. The angle $\theta$ is measured from the direction X in which the platform is moving. For purposes of explanation, the positive angle is taken as counter-clockwise, although obvious adjustments make it just as practical to use a clockwise direction. If R and $\theta$ are both known, the emitter may be located with respect to platform 10. If the location of platform 10 relative to the earth coordinate system is also known, then the location of emitter 12 in this coordinate system may be easily determined.

Assume now that aircraft 10 takes its first bearing reading $\theta 1$ on emitter 12 at time T1 when the aircraft is at position X1 and that it takes a large number of readings at fairly uniform time intevals until time Tn when the aircraft has moved to a new position Xn. Assuming that time T1 is ZERO, time Tn may be, for example, four to ten seconds. If it is further assumed that the velocity of aircraft 10 is constant during the time interval Tn, it can be shown that the least squares approximation to Rm, the range from point Xm at the mid-point of the flight path X1–Xn, is given by the following equation:

$$Rm = -\frac{V}{b}\sqrt{1+a^2} \qquad (1)$$

where:
V = aircraft velocity $$a = \frac{1}{n}\sum_{i=1}^{n} \cot \theta i$$

$$b = \frac{\sum_{1}^{n} Ti \cot \theta i}{\sum_{1}^{n} Ti^2}$$

n = number of cuts obtained
$\theta$ = instantaneous bearing angle
Ti = time at which the ith cut is taken Since both a range and a direction are required to determine the location of emitter 12, the angle $\theta m$ must also be obtained. This angle is given by $$\theta m = \cot^{-1} a \qquad (2)$$

The mathematical derivation of Equation 1 will be discussed in a later section. While the range Rm is of some interest, it requires the determination and storage of the location Xm. It is therefore of less interest than the parameters Rn and $\theta n$ from the point Xn. Equation 1 may be simply modified to update the range to substantially real time by use of the following relationship:

$$Rn = -\frac{V}{b}\sqrt{\left(+\frac{\prime}{2}\right)^2} \qquad (3)$$

The quantity Rn will continuously vary as new cuts are being taken. Since $\theta n$ is always the last bearing reading which was taken, this reading may be taken as the bearing in computing the location of the emitter. However, a more accurate smoothed or average bearing is obtained by use of the following relationship:

$$\theta = \cot^{-1}\left(a + \frac{bTn}{2}\right) \qquad (4)$$

*Circuit description and operation*

FIGS. 2A–2B show a circuit for implementing Equations 1–4 to obtain range and bearing values. When it is desired to take a bearing reading, start circuit 20 is energized to generate an output on line 22 which is applied to reset timer 24 and counter 26. Start circuit 20 may, for example, be a manually-operated pushbutton or switch. As timer 24 runs, it generates a sequence of time values Ti on output line 28. Each time a Ti output appears on line 28, a signal is applied to line 30 allowing direction finder 32 to generate a $\theta i$ output on line 34. The signal on line 30 also causes the count in counter 26 to be incremented by ONE. Synchronism between timer 24 and direction finder 32 is in this manner maintained. The $\theta i$ value on line 34 is applied through cotangent function generator 36 to line 38. The value on line 38 is therefore $\cot \theta i$. The value on line 38 is applied to summing circuit 40 and as one input to multiplier 42. The output from summing circuit 40 on line 44, the value of this output being $\Sigma \cot \theta i$, is applied as the numerator input to divider 46. The denominator input to divider 46 is output line 48 from counter 26. From Equation 1 it can be seen that the result of the division in divider 46 on output line 50 is the quantity (a).

The second input to multiplier 42 is output line 28 from timer 24. Output line 52 from multiplier 42 therefore carries the quantity (Ti cot $\theta i$). This quantity is applied through summing circuit 54 and line 56 to the numerator input of divider 58. The numerator input to divider 58 is therefore the quantity ($\Sigma Ti \cot \theta i$). Line 28 is also connected as the input to squaring circuit 60. Output line 62 from squaring circuit 60 therefore carries the quantity ($Ti^2$). This quantity is applied through summing circuit 64 and line 66 to the denominator input of divider 58. The denominator input to divider 58 is therefore the quantity ($\Sigma Ti^2$). From Equation 1 it can be seen that the result of the division in divider 58 on output line 68 is the quantity b.

Line 68 is connected as the denominator input to divider 70. The numerator input to divider 70 is output line 72 from aircraft speed indicator 74. The output from divider 70 on line 76 is therefore the quantity V/b, which quantity is one term of both Equations 1 and 3. Line 76 is connected as one input to multiplier 78.

At this point a decision must be made as to whether Rm or Rn is desired. Assume, first, that it is desired to obtain Rm. Under these conditions a signal appears on line 80 (FIG. 2A) to condition gate 82 and no signal appears on line 84. Gates 86 and 88 are therefore deconditioned. The conditioning of gate 82 permits the quantity a on line 50 to be passed through line 90 and OR gate 92 to line 94. The quantity on line 94 will now be referred to as W, although, for the example chosen, it is still the quantity a. The quantity on line 94 is passed through squarer 96 to obtain the quantity $W^2$ on line 98. This quantity is then applied through incrementer 100 to line 102. The signal on line 102 therefore represents the quantity $(1+W^2)$. This quantity is applied to square root circuit 104 resulting in a signal on line 106 which represents the quantity ($\sqrt{1+W^2}$). Line 106 is connected as the other input to multiplier 78. When it is remembered that, for the example chosen, W is in fact a, it is seen that, from Equation 1, the output from multiple 78 on line 108 is the absolute value of the desired range Rm. The quantity W on line 94 is also applied through inverse-cotangent-function circuit 110 to output line 112. Remembering again that W is in fact a for the example chosen, it can be seen from Equation 2 that the value on line 112 is in fact the bearing angle $\theta m$.

If, instead of Rm and $\theta m$, it is desired to obtain Rn and $\theta n$, the signal on line 80 is suppressed and a signal is applied through line 84 to condition gates 86 and 88. When gate 88 is conditioned, the quantity b on line 68 is applied through line 114 to one input of multiplier 116. The other input to multiplier 116 is output line 28 from timer 24. At any given instant, the Ti value on line 28 is actually Tn. The output from multiplier 116 on line 118 is therefore the quantity (bTn). This quantity is applied through halving circuit 120 and line 122 to one input of adder 124. This input to adder 124 is therefore the quantity (bTn/2). The other input to adder 124 is output line 126 from gate 86. With gate 86 conditioned by the signal on line 84, the quantity $a$ appears on line 126. Therefore, the output from adder 124 on line 128 is the quantity $(a+bTn/2)$. The signal on line 128 is applied through OR gate 92 to line 94. Therefore, with a signal on line 84, the quantity W on line 94 is $(a+bTn/2)$. This quantity is squared in squarer 96 and incremented by 1 in incrementer 100. The resultant, quantity, which is the quantity under the square root sign in Equation 3, has its square root taken in circuit 104 and is then applied as one input to multiplier 78. The inputs to multiplier 78 at this time are therefore the quantities required by Equation 3 and the resulting range on line 108 is the absolute value of the range $Rn$. The quantity on line 94 is also applied through inverse-cotangent-function circuit 110 to line 112. From Equation 4 it is seen that the quantity which appears on line 112 at this time is $\theta n$.

The elements of the circuit described above have been shown in general form and may, in fact, be digital, analog, or some combination of both. The elements may be combined as shown to form a special purpose computer or may form a part of a larger general purpose computer. In the latter situation, the functions of some of the elements, such as the summing circuits or the multipliers, could be combined into single elements, and the sequence of operations run under program control. It is also apparent that the circuit used would probably be set up to generate either $Rm$ or $Rn$, but not both. However, for purposes of generalization, the embodiment of FIGS. 2A–2B has been adapted to provide both values.

*Mathematical derivation*

Referring again to FIG. 1, assume that at time ZERO platform 10 is at a position (X1, 0) and emitter 12 is at a position (Xe, Ye).
Then:

$$Ye = R \sin \theta \quad (5)$$
$$Xe = X1 + R \cos \theta \quad (6)$$

Since the emitter is stationary, when Equation 5 is differentiated with respect to time $$\frac{dYe}{dT} = R \cos \theta \frac{d\theta}{dT} + \sin \theta \frac{dR}{dT} = 0 \quad (7)$$

also, when Equation 6 is differentiated with respect to time $$\frac{dX1}{dT} - \frac{dXe}{cT} = R \sin \theta \frac{d\theta}{dT} - \cos \theta \frac{dR}{dT} = V \quad (8)$$

When these two equations are solved simultaneously for R, the following is obtained:

$$R = \frac{V \sin \theta}{d\theta/dT} \quad (9)$$

Since the bearing rate, $d\theta/dT$ changes with time, the result of Equation 9 cannot be used directly to determine range without an almost instantaneous measurement of this quantity. However, as will now be shown, the quantity $$\frac{\frac{d\theta}{dT}}{\sin^2 \theta}$$

is a constant. The truth of the above statement may be vertified by recognizing the identity, $$\frac{d \cot \theta}{dT} = -\frac{\frac{d\theta}{dT}}{\sin^2 \theta} \quad (10)$$

Now, dividing Equation 6 by Equation 5 it is seen that:

$$\frac{Xe - X1}{Ye} = \frac{R \cos \theta}{R \sin \theta} = \cot \theta \quad (11)$$

Differentiating each side of Equation 11 gives $$-\frac{V}{Ye} = \frac{d \cot \theta}{dT} \quad (12)$$

Since emitter 12 is stationary, $Ye$ is a constant. If the platform also maintains a constant velocity, V is a constant and thus $d \cot \theta/dT$ is a constant. Combining Equations 9 and 10, it is seen that $$R = -\frac{V}{\sin \theta \frac{d \cot \theta}{dT}} \quad (13)$$

Since the time rate of change of the cotangent of the bearing angle has been shown to be a constant, the cotangent is itself a linear function of time. The reason for selecting $\cot \theta$ rather than $\theta$ itself in making the range determinations therefore becomes apparent. Since $\cot \theta$ is a linear function:

$$\cot \theta = A + BT \quad (14)$$

where $$A = \cot \theta_0 \quad (15)$$

and $$B = \frac{d \cot \theta}{dT} \quad (16)$$

Also, it must now be understood that $\theta_0$ is the bearing at time $T=0$, which is an arbitrary, but important point. Combining Equations 13 and 16 it is seen that:

$$R = -\frac{V}{B \sin \theta_0} \quad (17)$$

The range obtained by use of Equation 17 is the range R1 shown in FIG. 1, or, in other words, the range from the point where T is equal to ZERO. By trigonometric manipulation it may also be shown that:

$$\sin \theta_0 = \frac{1}{\sqrt{1 + A^2}} \quad (18)$$

When Equation 18 is substituted into Equation 17, the equation $$R = -\frac{V}{B}\sqrt{1 + A^2} \quad (19)$$

is obtained. The corresponding bearing is $$\theta_0 = \cot^{-1} A \quad (20)$$

Equations 19 and 20 are for the range R1 and bearing $\theta_1$ from point X1=0 (see FIG. 1). These equations are the same as Equations 1 and 2 except that parameters A and B have been substituted for the parameters $a$ and $b$ of Equations 1 and 2. This difference in values is brought about first by the fact that Equation 1 is being used to determine $Rm$ rather than R1 and, second, by the fact that Equation 1 obtains the desired time derivative by fitting the desired parameters, by the least squares method, to the measured data. As indicated before, Equation 3 differs from Equation 1 in that it provides $Rn$ rather than $Rm$. A least squares fitting approach is also used in Equation 3.

From the above discussion it is apparent that the platform velocity V must be known and that, for $\cot \theta$ to be a linear function of time, this velocity must remain constant over the time period $Tn$. While over a period of four to ten seconds it should not be difficult to maintain a constant platform velocity, this requirement is not really an absolute necessity. Navigation data could be used to adjust the times of the bearings taken on a non-constant velocity course so that the method could still be used in the event of irregular flight. Cross-wind and yaw might also be required in order to make highly accurate determinations. However, accuracies of 90 percent or better could be achieved without this additional data.

One point which has not heretofore been discussed is that of dimensions. In this respect, the terms under the square root sign in both Equations 1 and 3 are dimensionless quantities. Therefore, the dimensions of the range are the dimensions of V divided by the dimensions of $b$. $b$ is in units of 1/time. Therefore, if V is, for example, in feet-per-second, and $b$ is in units of 1/second, the range will be given in feet. More complicated combinations of units such as V in knots, and b in 1/microseconds, can be handled by changing scale factors through voltage dividers or attenuators or by introducing additional computational logic to output line 108.

From the above discussion it is apparent that real time location (i.e. the range and azimuth) of the emitter is available within a few milliseconds (the time taken for the data to pass through the circuitry of FIGS. 2A–2B) after the most recent bearing reading. This real time location permits the data to be displayed on, for example, a radar or similar screen. Readings may be taken until fluctuations in the located point have been eliminated. Since timer 24 may be generating outputs on lines 28 and 30 at a rate in the millisecond range, the number of readings which may be taken within a few seconds is very large. The effect of random errors on the final computations is therefore negligible.

While, because of its linear nature, the cotangent function has been used in making the range and bearing determinations in the preferred embodiment of the invention, any function of $\theta$ the time derivative of which is a constant could be used, although possibly with more difficulty. Similarly, linear approximation methods other than the least squares method could be used to fit the measured data to an ideal curve.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for determining the range of a fixed emitter from a moving platform comprising:
   means for determining the instantaneous bearing angle of said emitter relative to said platform;
   means for generating a function of said bearing angle the time derivative of which is a constant;
   means for determining the velocity of said platform; and
   means for utilizing said velocity and the output from said function generating means to compute said range.

2. A system of the type described in claim 1 including:
   means for compensating for errors in the detection of said bearing angles by fitting the outputs from said function generating means to a straight line by an approximation method.

3. A system of the type described in claim 2 wherein the approximation method utilized is the least squares method.

4. A system of the type described in claim 1 wherein the function of the bearing angle is the cotangent.

5. A system of the type described in claim 4 wherein the relationship used by said range computing means is:

$$\text{Range} = \frac{V}{B}\sqrt{1+A^2}$$

with:

$V$ = velocity of the platform
$A = \cot \theta_0$
$B = d(\cot \theta_1)/dT$
$\theta i$ = instantaneous bearing angle
$\theta_0$ = bearing angle at origin point of determination 6. A system of the type described in claim 5 including:
   means for estimating the variables A and B by a linear approximation method.

7. A system of the type described in claim 6 wherein the range ($Rm$) is computed from the midpoint of the flight path of said platform during the time period that readings are being taken;
   wherein said linear approximation method is the least squares method; and
   wherein the relationship used by said range computing means is:

$$Rm = -\frac{V}{b}\sqrt{1+a^2}$$

with:

$$a = \frac{1}{n}\sum_{i=1}^{n}\cot\theta i$$

$$b = \frac{\sum_{i=1}^{n}Ti\cot\theta i}{\sum_{i=1}^{n}Ti^2}$$

$n$ = number of samples or cuts
$Ti$ = time at which bearing angle $\theta i$ is measured 8. A system of the type described in claim 7 including means for determining the bearing angle ($\theta m$) from said midpoint by use of the relationship $$\theta m = \cot^{-1} a$$

9. A system of the type described in claim 6 wherein said range ($Rn$) is computed from the point where the last bearing is taken;
   wherein said linear approximation method is the least squares method; and
   wherein the relationship used by said range computing means is:

$$Rn = -\frac{V}{b}\sqrt{1+\left(a+\frac{bTn}{2}\right)^2}$$

with:

$V$ = velocity of the platform $$a = \frac{1}{n}\sum_{i=1}^{n}\cot\theta i$$

$$b = \frac{\sum_{i=1}^{n}Ti\cot\theta i}{\sum_{i=1}^{n}Ti^2}$$

$\theta i$ = instantaneous bearing angle
$Ti$ = time at which bearing angle $\theta i$ is measured
$n$ = number of samples or cuts
$Tn$ = time at which $n$th cut is made 10. A system of the type described in claim 9 including:
    means for determining the bearing angle ($\theta n$) from said point where the last bearing is taken by use of the relationship:

$$\theta n = \cot^{-1}\left(a+\frac{bTn}{2}\right)$$

11. A method for determining the range of a fixed emitter from a moving platform comprising the steps of:
    determining the instantaneous bearing angle of said emitter relative to said platform;
    generating a function of said bearing angle the time derivative of which is a constant;
    determining the velocity of said platform; and
    utilizing said velocity and the generated function of said bearing angle to compute said range.

12. A method of the type described in claim 11 including the step of:
    fitting the results of said function generating step to a straight line by an approximation method.

13. A method of the type described in claim 12 wherein the approximation method utilized is the least squares method.

14. A method of the type described in claim 11 wherein the function of the bearing angle is the cotangent.

15. A method of the type described in claim 14 wherein the relationship used by said range computing step is:

$$\text{Range} = -\frac{V}{B}\sqrt{1+A^2}$$

with:

$V$ = velocity of the platform
$A$ = cot $\theta_0$
$B = d\,(\cot \theta i)/dT$
$\theta i$ = instantaneous bearing angle
$\theta_0$ = bearing angle at origin point of determination

16. A method of the type described in claim 15 including the step of:
estimating the variables A and B by a linear approximation method.

17. A method of the type described in claim 16 wherein said range ($Rm$) is computed from the midpoint of the flight path of said platform during the time period that readings are being taken;
wherein said linear approximation method is the least squares method; and
wherein the relationship used during the range computing step is:

$$Rm = -\frac{V}{b}\sqrt{1+a^2}$$

with:

$$a = \frac{1}{n}\sum_{i=1}^{n} \cot \theta i$$

$$b = \frac{\sum_{i=1}^{n} Ti \cot \theta i}{\sum_{i=1}^{n} Ti^2}$$

$n$ = number of samples or cuts
$Ti$ = time at which bearing angle $\theta i$ is measured

18. A method of the type described in claim 17 including the step of:
determining the bearing angle ($\theta m$) from said midpoint by use of the relationship:

$$\theta m = \cot^{-1} a$$

19. A method of the type described in claim 16 wherein said range ($Rn$) is computed from the point where the last bearing is taken;
wherein said linear approximation method is the least squares method; and
wherein the relationship used during said range computing step is:

$$Rn = -\frac{V}{b}\sqrt{1+\left(a+\frac{bTn}{2}\right)^2}$$

with:

$V$ = velocity of the platform $$a = \frac{1}{n}\sum_{i=1}^{n} \cot \theta i$$

$$b = \frac{\sum_{i=1}^{n} Ti \cot \theta i}{\sum_{i=1}^{n} Ti^2}$$

$\theta i$ = instantaneous bearing angle
$Ti$ = time at which bearing angle $\theta i$ is measured
$n$ = number of samples or cuts
$Tn$ = time at which $n$th cut is made

20. A method of the type described in claim 19 including the step of:
determining the bearing angle ($\theta n$) from said point where the last bearing is taken by use of the relationship:

$$\theta n = \cot^{-1}\left(a + \frac{bTn}{2}\right)$$

References Cited

UNITED STATES PATENTS 3,090,957    5/1963    Albanese et al. _____ 343—112
3,241,143    3/1966    Unger et al.

RODNEY D. BENNETT, *Primary Examiner.*

R. E. BERGER, *Assistant Examiner.*